United States Patent [19]

Levy et al.

[11] 3,728,392

[45] Apr. 17, 1973

[54] PREPARATION OF P-NITROSODIPHENYLAMINE

[75] Inventors: Joseph Levy, Paramus, N.J.; Louis Seif, Bronx, N.Y.

[73] Assignee: Universal Oil Products Company, Des Plaines, Ill.

[22] Filed: July 20, 1970

[21] Appl. No.: 56,692

[52] U.S. Cl. .................................................. 260/576
[51] Int. Cl. .............................................. C07c 87/54
[58] Field of Search ..................................... 260/576

[56] References Cited

UNITED STATES PATENTS 2,782,235  2/1957  Lantz .................................. 260/576
3,429,924  2/1969  Ellerbrook et al .................... 260/576

*Primary Examiner*—Lewis Gotts
*Assistant Examiner*—C. F. Warren
*Attorney*—James R. Hoatson, Jr. and Bernard L. Kramer

[57] ABSTRACT

Preparation of a p-nitrosodiphenylamine by rearrangement of an N-nitrosodiphenylamine at a temperature of from about 20° to about 50°C. in the presence of hydrogen chloride and a two solvent system comprising a water immiscible alcohol and an aromatic solvent having boiling points of from about 80° to about 160°C.

10 Claims, No Drawings

PREPARATION OF P-NITROSODIPHENYLAMINE

BACKGROUND OF THE INVENTION

The synthesis of p-nitrosodiphenylamine involves the nitrosation of diphenylamine, followed by rearrangement of the N-nitroso derivative to the p-nitroso compound under the influence of acidic reagents. The preparation of the N-nitroso derivative is readily effected and appears to offer no problem. However, the rearrangement step has been the subject of considerable study as it presents many difficulties, both in conducting the reaction and in isolating the product. In general, an alcoholic solvent seems necessary for obtaining a satisfactory reaction and anhydrous hydrogen chloride appears to be the most effective acid for accomplishing the transformation. In one method proposed in the prior art, the rearrangement is effected by adding molten N-nitrosodiphenylamine with vigorous stirring to n-butanol to form a slurry, followed by the addition thereto of a solution of anhydrous hydrogen chloride also in butanol, thereby carrying out the reaction via a fine suspension of the nitroso compound in the alcohol solvent. However, here again isolation of the product and recovery of the solvent proved troublesome.

DESCRIPTION OF THE INVENTION

It now has been found that the arrangement is readily accomplished by effecting the reaction in a two solvent system comprising a water immiscible alcohol and an aromatic solvent having boiling points of about 80° to about 160°C. This improved process produces high yields of p-nitrosodiphenylamine of high purity. Furthermore, improved isolation and separation of the product as well as recovery of the solvent are accomplished.

As another advantage to the present invention, the intermediate N-nitrosodiphenylamine need not be isolated but can be extracted into the aromatic solvent or alcohol-aromatic mixture, as desired, from the reaction mixture in which it has been prepared. The extract then may be dried azeotropically and used directly for the rearrangement. This avoids the more laborious filtering, washing and drying operations previously utilized in the isolation of this intermediate product prior to rearrangement.

In one embodiment, the present invention relates to a process for the rearrangement of an N-nitrosodiphenylamine to the corresponding p-nitrosodiphenylamine which comprises effecting said rearrangement at a temperature of from about 20° to about 50°C. in the presence of hydrogen chloride and a two solvent system comprising a water immiscible alcohol and an aromatic solvent having boiling points of from about 80° to about 160°C.

In a preferred embodiment, N-nitrosodiphenylamine is rearranged to p-nitrosodiphenylamine. The p-nitrosodiphenylamine possesses varied utility, including use as an intermediate in the preparation of N-phenyl-N'-substituted-p-phenylenediamines. For example, N-phenyl-N'-cyclohexyl-p-phenylenediamine and N-phenyl-N'-$C_3$-$C_8$-secalkyl-p-phenylenediamines are effective antiozonants for use in rubber products. These substituted products are readily obtained by reductive alkylation of p-nitrosodiphenylamine with a suitable ketone. For example, N-phenyl-N'-cyclohexyl-p-phenylenediamine is prepared by the reductive alkylation of p-nitrosodiphenylamine with cyclohexanone. Similarly, the secalkyl derivatives are obtained by reductive alkylation with acetone, methylethyl ketone, methylpropyl ketone, methylbutyl ketone, methylamyl ketone, methylhexyl ketone, etc.

While the process of the present invention is particularly useful for the rearrangement of N-nitrosodiphenylamine, it is understood that the process also may be used for the rearrangement of derivatives thereof or related compounds including, for example, N-nitroso-N-methylaniline, N-nitroso-N-benzylaniline, N-nitroso-2,2'-dimethyldiphenylamine, N-nitroso-2-methoxy-2'-methyldiphenylamine, N-nitroso-4-cyclohexylaminodiphenylamine, N-nitrosophenyl-beta-naphthylamine, N-nitroso-di-alpha-naphthylamine, etc. Thus, one or both of the aryl rings may contain a substitutent which is inert to the conditions of the reaction and may be selected from alkyl of from one to about five carbon atoms, alkoxy of from one to about five carbon atoms, alkylamino of from one to about five carbon atoms, cycloaklylamino or other cycloalkyl containing substituent in which the cycloalkyl ring contains from five to six carbon atoms, aralkylamino and halogen.

The alcohol solvent for use in the two solvent system is immiscible with water and has a boiling point of from about 100°C. to about 160°C. Particularly preferred solvents comprise n-butanol, isobutanol, n-pentanol, and n-hexanol. By the term water immiscible, we mean that the alcohol forms a separate phase in contact with water, but may be partially miscible. The aromatic solvent has a boiling point of from about 80° to about 160°C., with toluene being particularly preferred. Other aromatic solvents include benzene, xylene, chlorobenzene, ethylbenzene, cumene, anisole, etc.

The proportions of alcohol and aromatic solvent may be varied over rather wide ranges but generally will be within the limits of from about 20 to about 80 and preferably from about 40 to about 60 parts by weight of one solvent and correspondingly from about 80 to about 20 and preferably from about 60 to about 40 parts by weight of the other solvent. The total amount of solvent used also may vary over wide limits but will be sufficient to form suitable solutions of the reactants and generally will range from about 1 to about 5 and preferably from about 1.5 to about 3 parts by weight of total solvent per 1 part by weight of the N-nitrosodiphenylamine.

The rearrangement is effected in any suitable manner. In a particularly preferred method, a solution of the N-nitrosodiphenylamine in the aromatic solvent is first prepared and this solution then is added to a solution of anhydrous hydrogen chloride in the alcohol solvent. The addition is effected gradually, preferably with suitable cooling to control the exothermic reaction temperature. In general, the addition may be made over a period of from about 0.25 to about 4 and preferably from about 0.5 to about 2 hours. The proportions of hydrogen chloride and N-nitrosodiphenylamine will be within the range of from about 1 to about 2 molecular proportions of hydrogen chloride per 1 molecular proportion of N-nitrosodiphenylamine and preferably from about 1 to about 1.5 molecular proportions.

A dark red, crystalline precipitate commences to form after the addition is started and continues throughout the addition. The slurry then is stirred and maintained at a temperature of from about 20° to about 50°C. and preferably from about 25° to about 35°C. The time of stirring will be sufficient to effect substantially complete reaction and may range from about 1 to about 8 and preferably 2 to about 5 hours. Preferably the time of reaction should be as short as possible because excessive time may result in deterioration of the product because of contact with the excess hydrogen chloride. Similarly, the temperature should be as low as satisfactory because too high a temperature may also cause decomposition.

The reaction is terminated in any suitable manner and conveniently by the addition of sufficient aqueous alkaline solution such as aqueous sodium hydroxide, aqueous potassium hydroxide, aqueous sodium carbonate, aqueous potassium carbonate, aqueous ammonia, etc. to neutralize the hydrogen chloride, following which the reaction mixture may be steam distilled to recover the solvents. Prior to the steam distillation, the pH of the mixture should be adjusted to within the range of 5.5 to 7 and preferably from about 6 to 7. It has been found that steam distillation at a pH above about 7 results in tarry byproducts, whereas at a pH below about 5.5, the product is converted into an insoluble material of undetermined composition. It is also advisable to conduct the steam distillation under reduced pressure so that the temperature of the reaction mixture does not exceed about 70°C. in order to avoid hydrolytic decomposition which results in the formation of tars. The 4-nitrosodiphenylamine separates in well defined crystals at the conclusion of the steam distillation, and the aqueous slurry so obtained is readily filtered and washed to recover the product.

As hereinbefore set forth, the process of the present invention affords high yields of p-nitrosodiphenylamine of a high purity. The use of the alcohol-aromatic solvent system offers advantages in recovering the product as well as in recovering the solvents for reuse as compared to the cumbersome isolating procedures of the prior art.

The following examples are introduced to further illustrate the novelty and utility of the present invention but not with the intention of unduly limiting the same.

EXAMPLE I

The N-nitrosodiphenylamine for use in the rearrangement reaction was prepared by charging 340 g. (2.05 mol) of diphenylamine, 91 g. of water and 110 g. of sulfuric acid (93 percent) into a 5 liter 4-neck flask equipped with a stirrer, dropping funnel, thermometer, water condenser and gas bubbler. The mixture was heated to 65°C. with good mixing. While maintaining the temperature at 65°–70°C., 114 g. (2.1 mol) of sodium nitrite dissolved in 340 g. of water were added over a period of about 1 hour. Stirring was continued for about an additional 30 minutes.

The reaction mixture was cooled to about 25°C. with stirring. Crystallization of the product occurred and the crystals were collected by filtering and then water washed and dried. There were recovered 406 g. (2.05 mol) of N-nitrosodiphenylamine as light brown crystals having a melting point of 67°–68°C., which corresponds to the reported melting point. The yield in this run was approximately 100 percent.

In another method of isolating the product, the reaction mixture was extracted at 70°C. with 200 g. of toluene, and the toluene layer then was separated and dried by azeotropically distilling out the water with toluene. The resulting solution was adjusted to the desired weight with toluene for the subsequent rearrangement reaction.

EXAMPLE II

The rearrangement of N-nitrosodiphenylamine to p-nitrosodiphenylamine was effected as follows. The reaction was carried out in a 2 liter 4-neck flask equipped with a stirrer, dropping funnel, thermometer, water condenser and gas bubbler. There were charged 230 g. of n-hexanol and anhydrous hydrogen chloride was bubbled in with cooling, keeping the temperature at about 20°–30°C. until 48 g. were absorbed. The reaction mixture was cooled to about 25°C. and, while maintaining the temperature at 25°–35°C. with cooling, 200 g. (1.01 mol) of N-nitrosodiphenylamine dissolved in 200 g. of toluene were added over a period of about 1 hour.

Separation of a dark red, crystalline precipitate commenced after about 15–20 minutes and continued throughout the addition. The slurry was then stirred for about 4 hours at about 35°C, after which the reaction was terminated by the addition, with vigorous stirring, of a solution of 60 g. of sodium hydroxide in 240 g. of water keeping the temperature below about 50°C.

The alkaline mixture consisted of a heavy but stirrable slurry. The pH was then adjusted to about 6.5 with hydrochloric acid and the solvents recovered by steam distillation, in vacuo, at a pot temperature of about 50°–65C. and pressure ranging from about 150 mm., initially, to 10 mm. at the conclusion of the distillation.

The p-nitrosodiphenylamine separated as well defined crystals which were readily filtered, washed with water and dried. There were recovered 197 g. of bluish black crystals having a melting point of 142°–144°C., (reported melting point; 143°–144°C). The yield in this run was 98.5 percent overall, based on the diphenylamine charged to the initial nitrosation step. The product was soluble in acetone and 10 percent aqueous sodium hydroxide. The purity as determined by U.V. analysis compared to a commercial sample was 96.5 percent.

The wet recovered solvent was fractionally distilled to give a recovery of 95 percent of the toluene and 92.5 percent of the hexyl alcohol.

EXAMPLE III

Another run was made in substantially the same manner as described in Example II except that benzene was used as the aromatic solvent and n-butyl alcohol as the alcohol solvent. In this run a solution of 48 g. of hydrogen chloride dissolved in 250 g. of n-butyl alcohol and 200 g. of N-nitrosodiphenylamine dissolved in 200 g. of benzene were charged to the process. While comparable yields of p-nitrosodiphenylamine were obtained, the recovery of the solvents was somewhat more difficult because of the relatively low boiling point of benzene. Accordingly, toluene and n-hexyl alcohol are the preferred solvent system as illustrated in Example II for this rearrangement.

EXAMPLE IV

Still another run was made in substantially the same manner as described in Example II except that a mixture of n-butyl alcohol and toluene was used for both solutions. A solution of 24 g. of anhydrous hydrogen chloride in 75 g. of n-butyl alcohol and 100 g. of toluene was charged to a reaction flask and then a solution of 100 g. of N-nitrosodiphenylamine in 75 g. of n-butyl alcohol and 100 g. of toluene was gradually added to the reaction flask. In this run about twice the total volume of solvent was required because of the lower solubility of the N-nitroso compound in the solvent mixture. However, with this system, recovery of the mixture of solvents is accomplished without the necessity of fractionally distilling them apart because of their close boiling points. Isobutyl alcohol may also be used in admixture with toluene in this procedure.

EXAMPLE V

In another run, which was made in substantially the same manner as described in Example II, the toluene solution of N-nitrosodiphenylamine used as the charge was obtained by extracting the reaction mixture of the nitrosation step with toluene, separating the toluene layer and drying by azeotropic distillation. In this run, the toluene solution was added to a solution of anhydrous hydrogen chloride in butanol. This run gave an overall weight yield of 99.5 percent.

We claim as our invention:

1. A process for the rearrangement of an N-nitrosodiarylamine to the corresponding p-nitrosodiarylamine by effecting said rearrangement at a temperature of from 20° to 50°C. in the presence of hydrogen chloride and a two solvent system consisting of a water immiscible alcohol and an aromatic solvent having boiling points from 80° to 160°C.

2. The process of claim 1 in which N-nitrosodiphenylamine is rearranged to p-nitrosodiphenylamine in a two solvent system of a water immiscible alcohol having a boiling point from about 100°–160°C. and toluene.

3. The process of claim 2 in which said alcohol is n-butyl alcohol.

4. The process of claim 2 in which said alcohol is isobutyl alcohol.

5. The process of claim 2 in which said alcohol is n-hexyl alcohol.

6. The process of claim 1 in which a solution of the N-nitrosodiphenylarylamine in the aromatic solvent is added gradually to a solution of the hydrogen chloride in the alcohol solvent.

7. The process of claim 6 in which a toluene solution of N-nitrosodiphenylamine is added to a hydrogen chloride solution in n-hexyl alcohol.

8. The process of claim 1 in which a solution of the N-nitrosodiphenylamine in a mixture of the aromatic and alcohol solvents is added gradually to a solution of hydrogen chloride in a mixture of the aromatic and alcohol solvents.

9. The process of claim 1 in which the reaction is terminated by the addition of an aqueous alkaline solution selected from aqueous sodium hydroxide, aqueous potassium hydroxide, aqueous sodium carbonate, aqueous potassium carbonate and aqueous ammonia.

10. The process of claim 9 in which the pH of the reaction mixture is adjusted to from about 5.5 to about 7 and then subjected to steam distillation under vacuum to separate the p-nitrosodiphenylamine and to recover the solvents.

* * * * *